United States Patent [19]
Ueda

[11] Patent Number: 5,917,511
[45] Date of Patent: Jun. 29, 1999

[54] PRINTER WITH IMAGE OUTPUT CHARACTERISTICS CORRECTING FUNCTION

[75] Inventor: Masashi Ueda, Nagoya, Japan

[73] Assignee: Brother Kogyo Kabushiki Kaisha, Nagoya, Japan

[21] Appl. No.: 08/648,576

[22] Filed: May 16, 1996

[30] Foreign Application Priority Data

May 18, 1995 [JP] Japan .................................. 7-119920

[51] Int. Cl.⁶ .................................................. B41J 29/393
[52] U.S. Cl. .............................................. 347/19; 347/14
[58] Field of Search .......................... 400/54, 74; 347/19, 347/5, 9, 14

[56] References Cited

U.S. PATENT DOCUMENTS

| | | | |
|---|---|---|---|
| 5,347,369 | 9/1994 | Harrington | 358/401 |
| 5,550,956 | 8/1996 | Tadokoro | 347/19 |
| 5,598,272 | 1/1997 | Fisch et al. | 347/19 |
| 5,610,639 | 3/1997 | Takada et al. | 347/19 |

*Primary Examiner*—John Hilten
*Attorney, Agent, or Firm*—Oliff & Berridge, PLC

[57] ABSTRACT

The test print data 30 not only includes the gray level examining charts but also includes explanations of the manual procedures. Accordingly, the user can easily perform the output characteristic setting operation. The test samples are automatically printed out in various situations where the output characteristic might be changed. Accordingly, the operability of the printer are greatly enhanced.

22 Claims, 15 Drawing Sheets

PRINTER WITH IMAGE OUTPUT CHARACTERISTICS CORRECTING FUNCTION

BACKGROUND OF THE INVENTION

1. Field of the Invention

The present invention relates to a printing apparatus and more particularly to a printing apparatus with an image output characteristic correcting function.

2. Description of the Related Art

Generally, an ink jet printer is supplied with tone signals from an external controller. The ink jet printer controls an internally-provided print head to eject inks according to the tone signals.

The amount of ejected inks is altered according to production lots of the print heads. Even in each printer, the ejected ink amount varies according to change in temperature and/or moisture. The ejected ink amount also varies as time passes after the printer is produced. Accordingly, the ink jet printer fails to continue reproducing the same image quality.

SUMMARY OF THE INVENTION

In order to solve this problem, it is conceivable to examine a tone reproduction characteristic of the printer every time when the printer is desired to perform printing operation. Based on the examined tone reproduction operation, tone signals are corrected so that the printer can provide a fixed image quality.

This tone reproduction examination, however, requires special equipment such as a densitometer to measure gray levels produced by the printer. When the printer is mounted with such a special equipment, the printer will become highly expensive. A skilled operator is desired to accurately correct tone signals based on the examined results. Such a skilled operator is not always available for use with every printer.

It is therefore, an object of the present invention to overcome the above-described drawbacks, and to provide an improved printer whose output characteristic can be easily corrected by users.

In order to solve these and other objects, the present invention provides a printing apparatus for correcting input image data and for printing out the corrected input image data; the printing apparatus comprising: correction value memory means for storing correction values employed for correcting input image data; image information memory means for storing reference image information inclusive of figure information and character information, the figure information being used for determining a characteristic value of the printing apparatus, the character information including information on manual procedures employed for determining the characteristic value; printing means for printing the reference image information; characteristic value setting means for setting the characteristic value according to the printed reference image information; correction value changing means for changing the correction value stored in the correction value memory means based on the set characteristic value; and correction means for correcting input image data based on the changed correction value stored in the correction value memory means.

According to another aspect, the present invention provides a printing apparatus for correcting input image data and for printing out the corrected input image data; the printing apparatus comprising: correction value memory means for storing correction values employed for correcting input image data; image information memory means for storing reference image information used for determining a characteristic value of the printing apparatus; information detecting means for detecting certain information in the printing apparatus; printing means for printing the reference image information based on the detected results; characteristic value setting means for setting the characteristic value according to the printed reference image information; correction value changing means for changing the correction value stored in the correction value memory means based on the set characteristic value; and correction means for correcting input image data based on the changed correction value stored in the correction value memory means.

BRIEF DESCRIPTION OF THE DRAWINGS

The above and other objects, features and advantages of the invention will become more apparent from reading the following description of the preferred embodiment taken in connection with the accompanying drawings in which:

FIGS. 3(A)–3(C) illustrate how the printer of FIG. 1 produces correction values, in which FIG. 3(A) shows output characteristic of an actual condition representative of a relationship between actual tone signal values and accurate densities; FIG. 3(B) shows normal output characteristic representative of a relationship between normal tone signal values and accurate densities; and FIG. 3(C) shows corrected tone signal levels providing accurate densities;

DETAILED DESCRIPTION OF THE INVENTION

Figure 1:
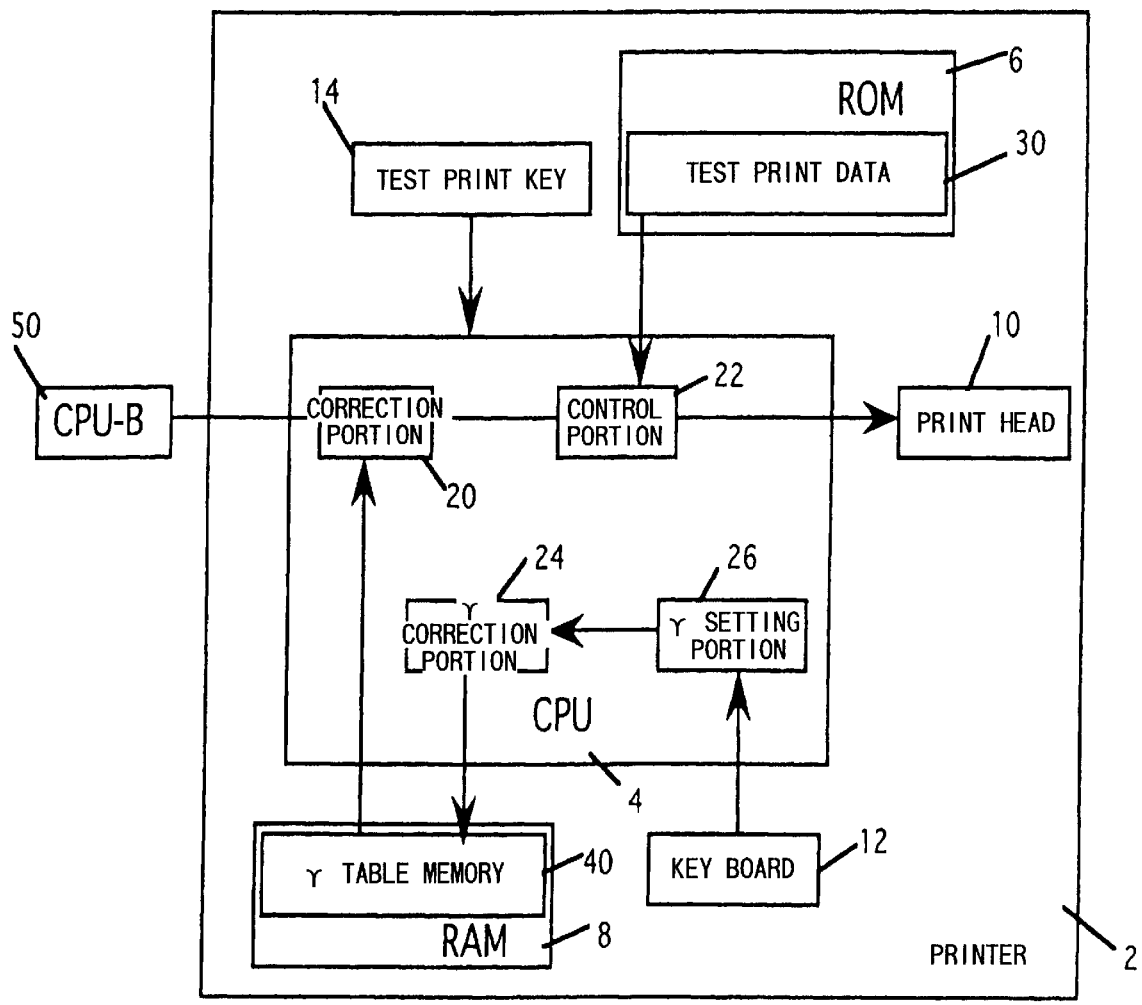
FIG. 1 is a block diagram showing a basic structure of a printer of the present invention.

A printer according to the present invention will be described while referring to the accompanying drawings wherein like parts and components are designated by the same reference numerals as those shown in FIGS. 1 through 15 to avoid duplicating description.

First, a basic structure of a printer of the present invention will be described with reference to FIGS. 1 through 3.

As shown in FIG. 1, the printer 2 of the present invention is electrically connected to an external central processing unit (CPU-B) 50 so that data communication is established therebetween.

The printer 2 includes: a CPU 4, a ROM 6, a RAM 8, a print head 10, a key board 12, and a test print key 14. Tone signals are inputted from the CPU-B 50 to the CPU 4. The key board 12 includes a characteristic set key for setting a characteristic value of the printer 2 as will be described later. The CPU 4 is connected to both the key board 12 and the test print key 14 so that data inputted from the key board 12 and the test print key 14 are transferred to the CPU 4. The CPU 4 is connected to the ROM 6 so that the CPU 4 can read out data from the ROM 6. The CPU 4 is also connected to the RAM 8 so that the CPU 4 can write data in and read data out from the RAM 8. The CPU 4 is further connected to the print head 10 so that the CPU 4 can output a control signal to the print head 10.

The ROM 6 stores therein test print data 30. The RAM 8 is internally formed with a γ table memory 40 storing correction values used for correcting inputted tone signals.

The CPU 4 is formed with: a correcting portion 20, a control portion 22, a RAM 8 γ-correction portion 24, and a RAM 8 γ-setting portion 26. The RAM 8 γ setting portion 26 is for receiving characteristic values of the printer 2 from the key board 12, setting the received characteristic values, and outputting the characteristic values to the γ correcting portion 24. The γ-correction portion 24 serves to correct the correction values stored in the γ table memory 40. In more concrete terms, based on the received characteristic values, the γ correcting portion 24 calculates correction values. The γ correcting portion 24 writes the newly calculated correction values over the correction values already stored in the γ table memory 40.

The correcting portion 20 is for receiving tone signals from the CPU-B 50, correcting the tone signals based on the correction values read out from the γ table memory 40, and outputting corrected tone signals to the control portion 22. The control portion 22 is for receiving the corrected tone signals from the correcting portion 20, converting the corrected tone signals to printing control signals, and outputting the printing control signals to the print head 10. The control portion 22 is further for receiving test print data 30 from the ROM 6, converting the test print data to printing control signals, and outputting the printing control signals to the print head 10. Various types of print heads can be employed as the print head 10. For example, an ink jet print head can be employed.

With the above-described structure, the CPU-B 50 transfers tone signals to the CPU 4. The received tone signals are corrected in the correcting portion 20 based on the correction values stored in the γ table memory 40 in a correction manner as will be described later. The corrected tone signals are converted in the control portion 22 into control signals for driving the print head 10. The control signals are then fed to the print head 10. The print head 10 then performs printing operation based on the control signals.

The correction values stored in the γ table memory 40 are calculated in the following manner.

When the CPU 4 judges that a user pushes down the test print key 14, the CPU 4 reads out test print data 30 from the ROM 6, and transfers the data to the control portion 22. In the control portion 22, the data is converted into control signals for driving the print head 10 in the same manner as described above for tone signals inputted from the CPU-B 50. The print head 10 is controlled by the control signals to print out a test sample shown in FIG. 2.

Figure 2:
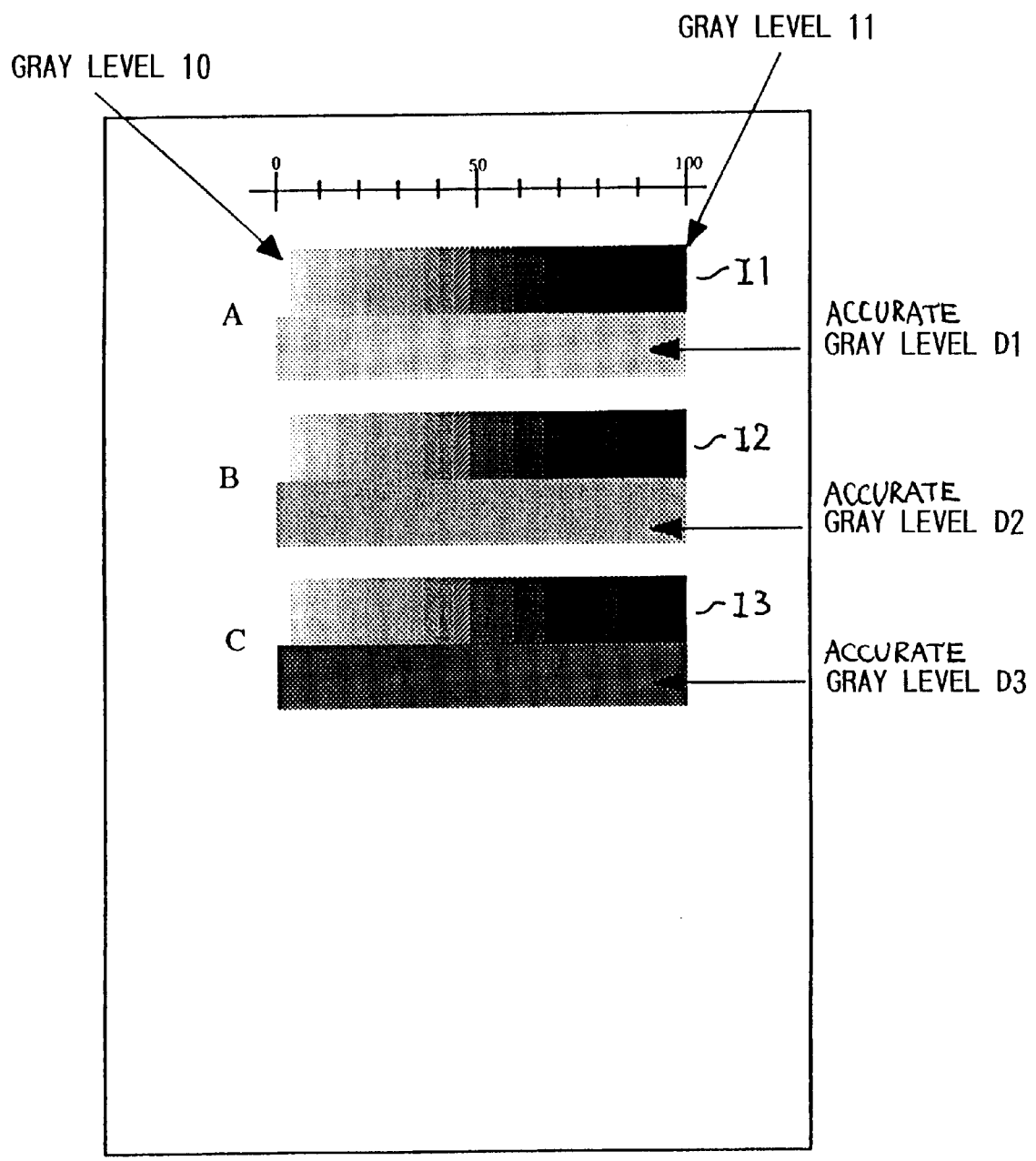
FIG. 2 shows one example of a test sample printed by the printer of FIG. 1.
Figure 3:
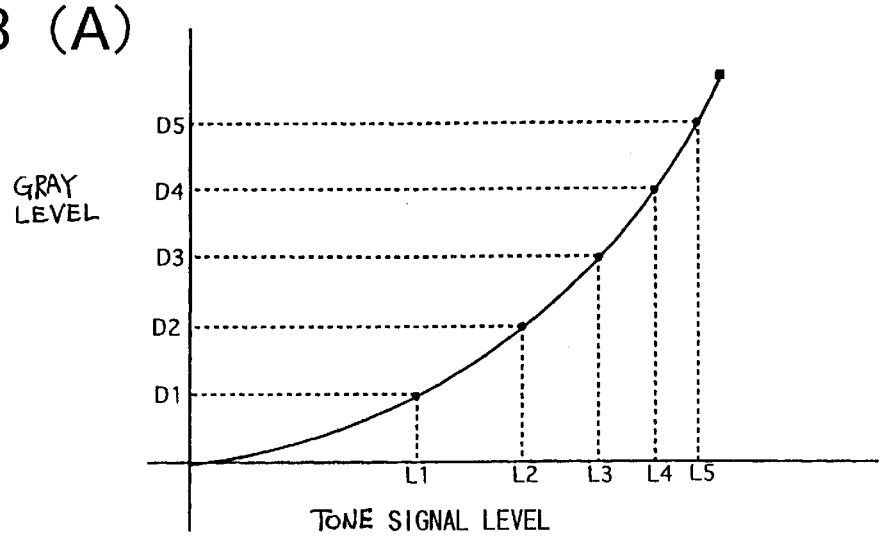
Figure 3:
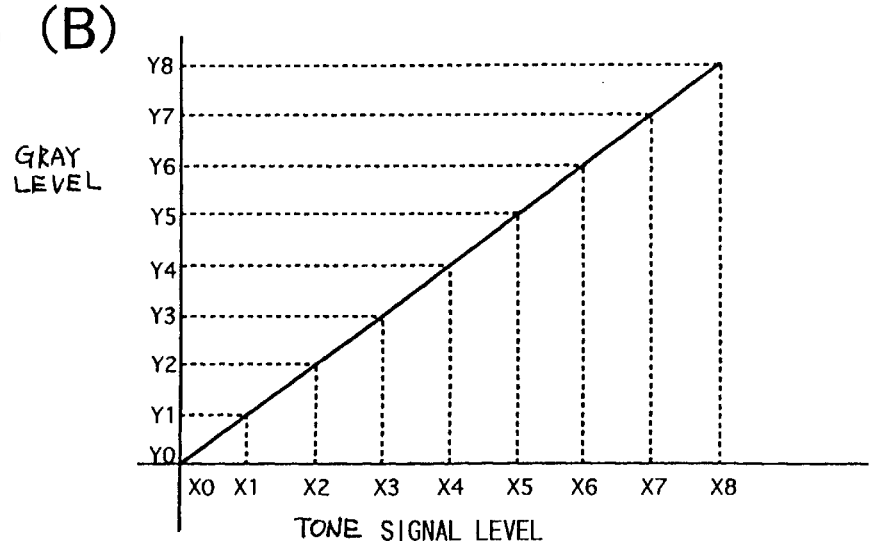
Figure 3:
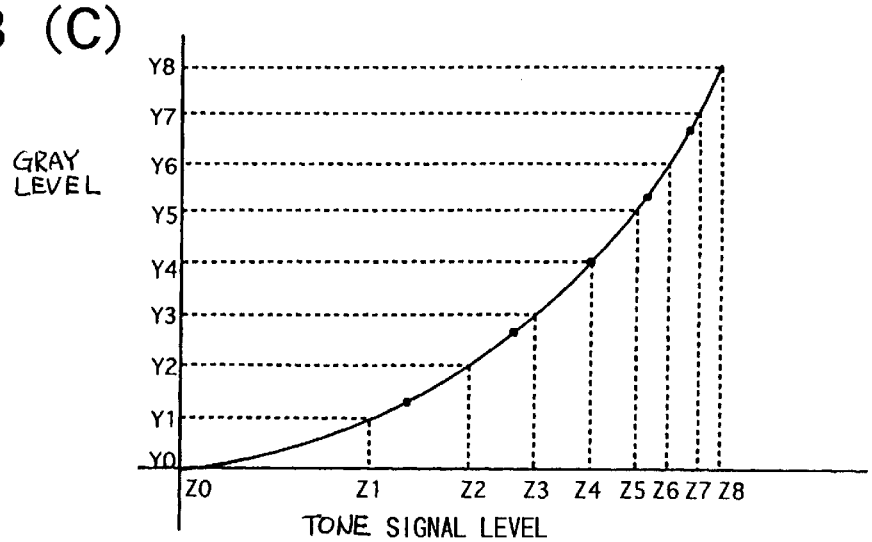

As shown in FIG. 2, in this example, the test sample is printed with three smoothly increasing sequences I1, I2, and I3 of gray levels. In each sequence, gray levels become darker toward from its lefthand end toward its righthand end. The grays in the sequences are produced in a normal manner by the print head 10. For example, when the printer 2 normally produces images by printing a fine pattern of black ink dots, the gray level sequences are formed by printed fine patterns of black ink dots. Each of the gray sequences I1, I2, and I3 is obtained based on a plurality of tone signals which are gradually varying from a value of 10 to another value of 11. The gray levels in the sequences are therefore possibly altered due to the above-described various causes, such as change in temperature.

Three bands of different accurate gray level standards D1, D2, and D3 are respectively provided on the lower sides of the gray level sequences I1, I2, and I3. Thus, the gray level sequence I1 and the gray level standard D1 compose an examination part A. The gray level sequence I2 and the gray level standard D2 compose an examination part B. The gray level sequence I3 and the gray level standard D3 compose an examination part C.

These accurate gray level standards are printed in a different manner from the gray level sequences. That is, these gray level standards are printed in a manner different from the normal printing manner, but in a manner so that the gray level standards can represent very accurate gray levels. In this example, the gray level standards are formed by printing a coarse pattern of black stripes or black checks. Such coarse printed patterns are unacceptable for normal printing operation because the shapes of the stripes or checks are highly visible when viewed from a normal viewing distance. However, when viewed from a greater viewing distance, these coarse patterns can provide very accurate gray levels. Details of these gray level sequences and the accurate gray level standards are described in detail in U.S. Pat. No. 5,347,369 to Harrington.

Receiving the printed test sample of FIG. 2, the user views the test sample from a certain distance so that the gray level standards D1, D2, and D3 appear gray in color. The user then compares the gray level sequence I1 with the adjacent gray level standard D1. The user determines a point along the gray level sequence I1 which appears equal to the accurate gray level D1. The point can be indicated by one of the values arranged along a scale printed on the uppermost position of the test sample. The user manipulates the key board 12 to input a value P1 (where $0 \leq P1 \leq 100$) of that point. The user thus inputs the values P1 as a characteristic value of the printer 2.

Receiving the inputted point value P1, the γ setting portion 26 sets therein the value P1 as a characteristic value of the printer. The γ setting portion 26 then calculates a tone signal L1 through the following equation (1):

$$L1 = (11 - 10) \times P1/100 + 10 \tag{1}$$

This tone signal L1 will control the printer 2 to provide the same gray level as the accurate gray level D1. The γ setting portion 26 also sets the tone signal L1 therein.

Similarly, the user compares the gray sequence I2 and the gray level standard D2, and determines the point P2 which appears equal to the gray level D2. The user further compares the gray sequence I3 and the gray level standard D3, and determines the point P3 which appears equal to the gray level D3. Receiving the inputted points P2 and P3, the γ setting portion 26 also sets therein these point values P2 and P3 as characteristic values of the printer 2. The γ setting portion 26 then calculates tone signals L2 and L3 in the same manner as described above. These tone signals L2 and L3 will provide the same gray levels as the accurate gray levels D2 and D3. The γ setting portion 26 then sets therein these values L2 and L3.

Through these operations, several tone signals Li ($i \geq 1$) can be determined. These tone signals Li will provide the same gray levels as accurate gray levels Di ($\geq 1$). These tone signals Li therefore determine an actual tone reproduction characteristic of the printer 2. Thus, the actual characteristic of the printer can be determined without using special equipment. It is noted that in the above description, because three examination parts A, B, and C are printed in the test sample, three tone signals L1, L2, and L3 are obtained. However, more than three tone signals can be obtained where the test sample is printed with more than three examination parts.

FIG. 3(A) shows thus obtained actual tone reproduction characteristic of the printer 2. This tone reproduction characteristic shows that when five tone signals L1 through L5 are inputted, the printer 2 will output gray levels D1 through D5, respectively. Thus determined actual characteristic of the printer 2, however, differs from a standard tone reproduction characteristic of the printer which is represented by FIG. 3(B). When tone signals X0, X1, ..., and X8 are inputted, the printer in the standard condition can print gray levels of Y0, Y1, ..., and Y8, respectively. Information on this normal reproduction characteristic is stored in a certain region in the γ correcting portion 24.

The γ correcting portion 24 calculates correction values capable of correcting for the difference between the actual characteristic and the standard characteristic. In more concrete terms, the γ correcting portion 24 calculates the correction values in the following manner.

First, the standard densities Y0 through Yn obtained by tone signals X0 through Xn are determined from the standard reproduction property of FIG. 3(B) where n>0. The tone signals X0 through Xn are arranged at a certain interval (for example, 32) from a minimum tone signal (0) to a maximum tone signal (for example, 255). Next, the actual tone reproduction characteristic data of FIG. 3(A) now set in the γ setting portion 26 are subjected to a linear interpolation method. This method calculates actual tone signals Z0–Zn which are capable of providing the standard densities Y0–Yn. These actual tone signals Z0–Zn are shown in FIG. 3(C). These actual tone signals Z0–Zn are stored as correction values in the γ table memory 40 at addresses indicated by the address numbers Ad ($0 \leq Ad \leq n$).

According to the printer thus stored with the correction values Z0–Zn, When tone signals are inputted from the external CPU-B 50, the correcting portion 20 corrects the tone signals with using the correction values in the following manner.

When a tone signal having a value of IN is inputted to the CPU 4 from the external CPU-B 50, an address data Ad in the γ table memory 40 is determined by the following formula (2):

$$Ad = (int)IN/32 \tag{2}$$

where (*int*) is a function for converting the value of IN/32 into an integer.

Then, referring to the obtained address data Ad, the correcting portion 20 converts the inputted tone signal value IN to a corrected value OUT by the following formula (3):

$$OUT = (Z(Ad+1) - Z(Ad)) \times (IN - Ad \times 32)/32 + Z(Ad) \tag{3}$$

where Z(Ad) and Z(Ad+1) represent actual tone signals (correction values) stored in the γ table memory 40 at addresses Ad and Ad+1.

As apparent from the above, even when the actual tone reproduction characteristic of the printer 2 varies, a gray level obtained for the input tone signal IN can be made unchanged by simply correcting the correction values Z stored in the memory 40.

Thus, the actual tone reproduction characteristic of the printer 2 can be examined without using any expensive special equipment. Even with a simple structure, this improved printer 2 can still perform its printing operation with a stable tone reproduction characteristic.

According to the present invention, the printer 2 is further provided with various mechanisms and functions as will be described below so that the user can more easily correct the output characteristic of the printer 2 and so that the output characteristic of the printer 2 can be reliably maintained.

Figure 4:
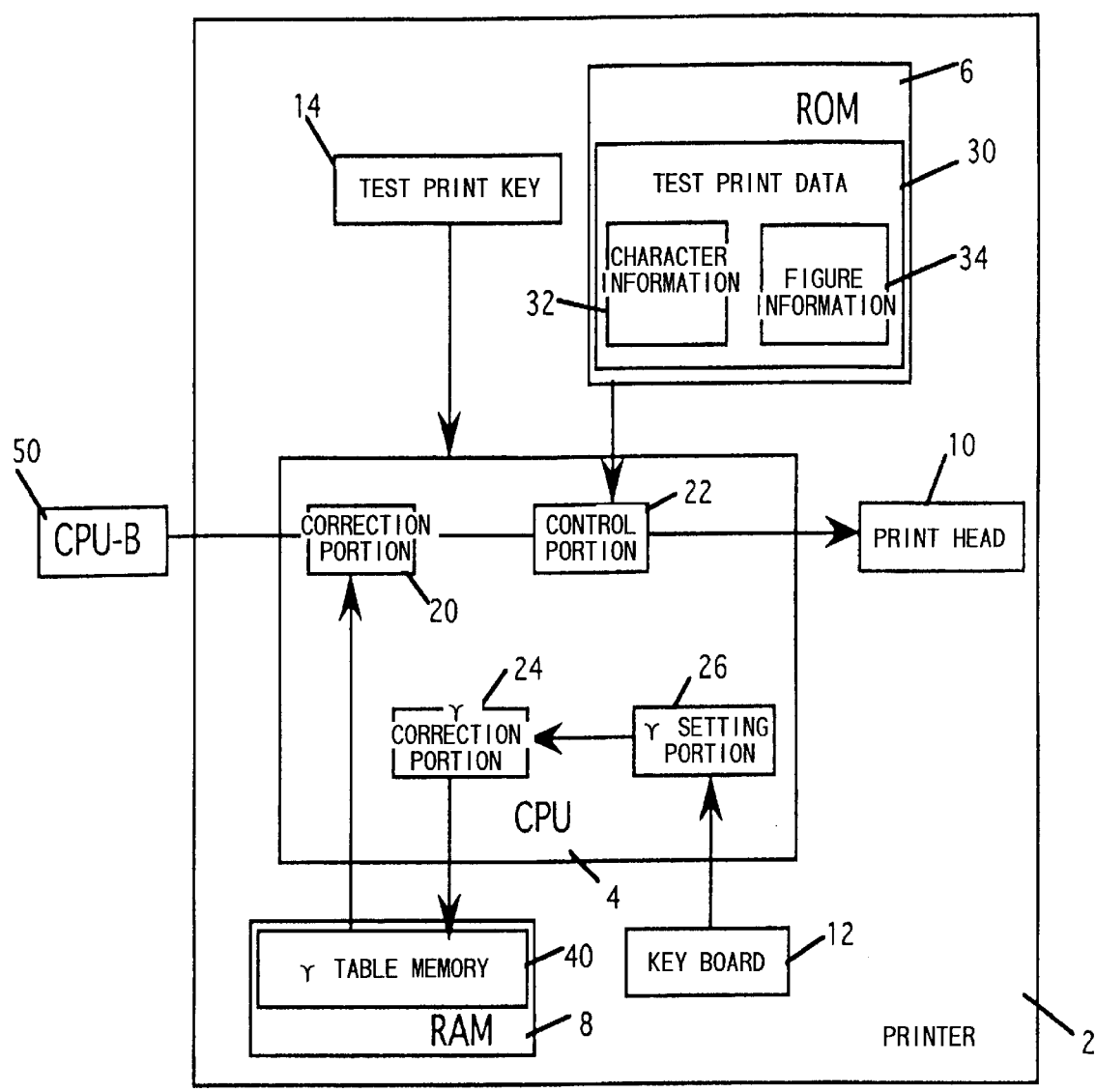
FIG. 4 is a block diagram showing a structure of a printer according to a first embodiment of the present invention.

First, a printer according to a first embodiment of the present invention will be described with reference to FIGS. 4 and 5.

According to the above-described printer 2, when a test sample is printed out, the user visually compares the accurate gray level standards and the gray level sequences, and determines the characteristic values P1, P2, ... of the printer 2. The user then inputs the determined values to the printer. These processes are not so easy for general users. General users will therefore perform these processes while watching a manual book of the printer. The first embodiment therefore provides a more easily operable printer. The user can perform the characteristic value inputting operation without watching a manual. Even when the user loses the manual, the user can still correct the characteristic of the printer.

According to the present embodiment, the test print data 30 stored in the ROM 6 includes a character information 32 and a figure or chart information 34. Other components of the printer 2 of the present embodiment are the same as those in the printer 2 of FIG. 1.

With such a structure, when a user pushes the test print key 14, the control portion 22 receives both the character information 32 and the figure information 34 of the test print data 30. The control portion 22 converts these information into print control signals for driving the print head 10. The print head 10 is controlled by the print control signals to print a test sample as shown in FIG. 5.

The test sample is divided into parts I and II. The part I is printed according to the figure or chart information 34, and the part II is printed according to the character information 32. That part I is a tone examination chart. That is, similarly to the test sample of FIG. 2, the part I has three examination parts A, B, and C. Each of these parts A, B, and C has a gray level sequence band and an accurate gray level band. The part II describes the manual information how the user should do to set the present characteristic values of the printer 2. The user sets the characteristic values of the printer 2 while viewing the part II of the test sample in the following manner.

First, according to step (1), the user determines a point on the gray level sequence I1 in the part A which appears the same as the accurate gray level D1. According to step (2), then, the user does the same operation as to the parts B and C. The user then writes down the values of the determined points into boxes A, B, and C given on the bottom of the part II. Afterward, according to step (3), the user inputs to the printer 2 the determined values now written in the boxes.

Thus, the user's determined values are inputted to the printer 2 as the characteristic values. Because the user has written down the determined values in the boxes, the user will not input wrong values.

Thus, according the present embodiment, processes required to correct the present characteristic of the printer are printed on the test sample. It becomes unnecessary for the user to watch the manual. The user can perform the correction operation very easily.

Next, a second embodiment will be described with reference to FIGS. 6 through 10.

The structure of the printer 2 of the present embodiment is the same as that of the printer of the first embodiment except for a control program stored in the ROM 6.

Figure 6:
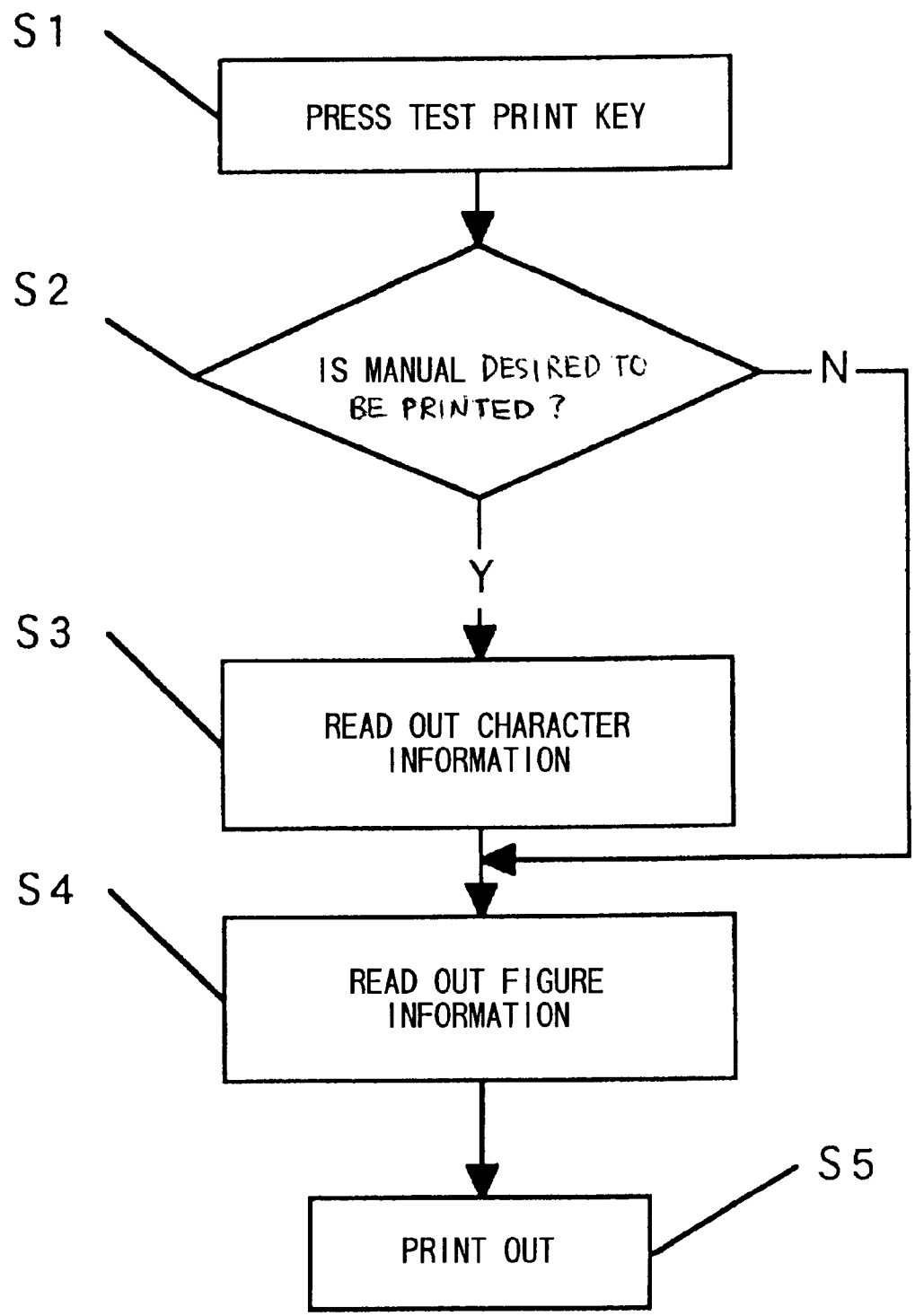
FIG. 6 is a flow chart illustrating an operation of a second embodiment of the present invention.

The control program of the present embodiment will be described below with reference to FIG. 6.

Figure 5:
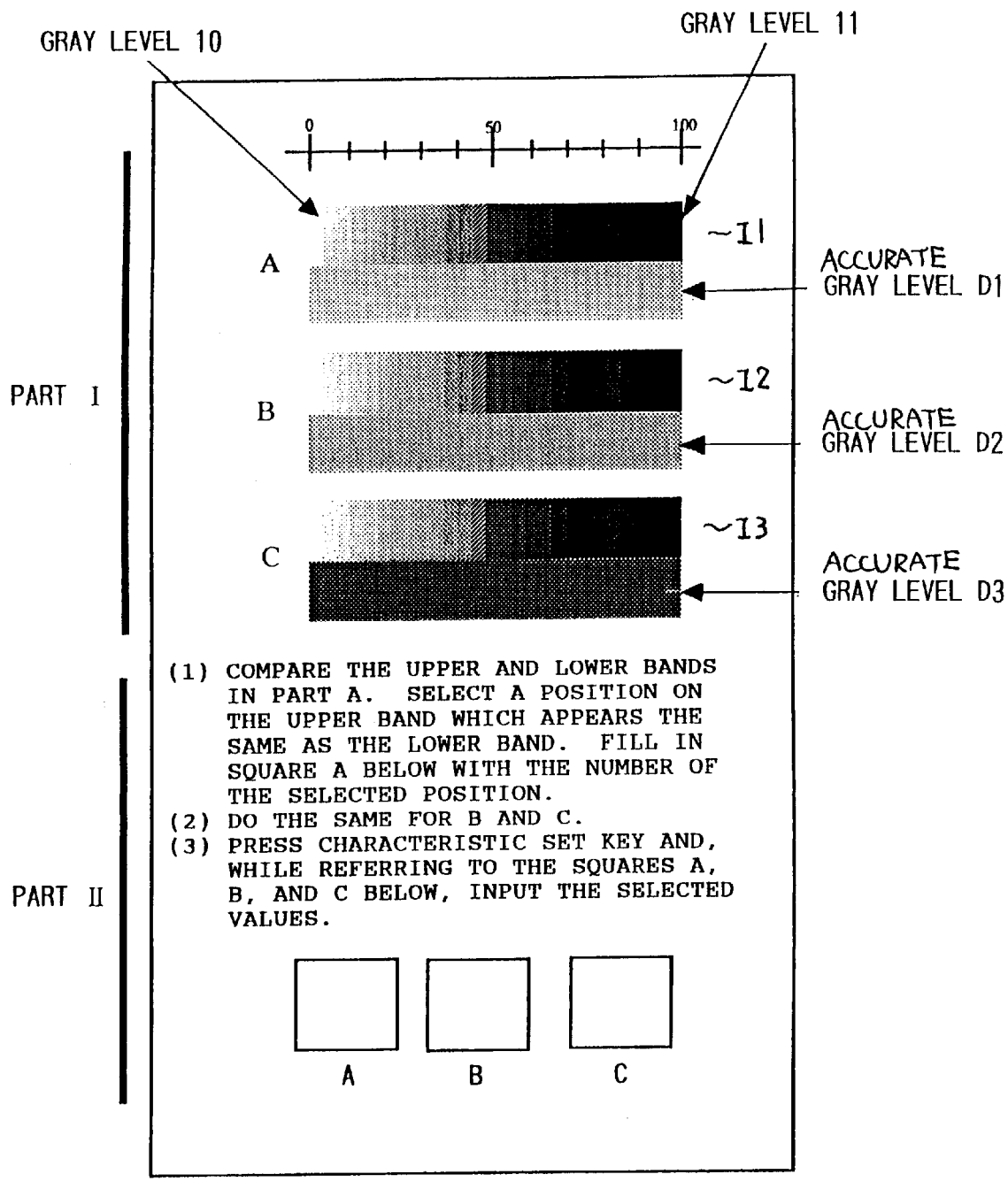
FIG. 5 shows one example of a test sample printed by the printer of FIG. 4.

When the test print key 14 is operated ("Yes" in S1), the control portion 22 controls a printer display provided on the printer 2 (not shown in the drawing) in S2 to display whether the user desires to watch the explanations of the manual procedures (1)–(3) in FIG. 5. If the user inputs "Y" (yes) through the key board 12 ("Yes" in S2), the control portion 22 reads out in S3 the character information 32 from the ROM 6. The control portion 22 then reads out in S4 the figure information 34. The control portion 22 then converts data of both information 32 and 34 into printing control signals and controls the print head 10 to print a test sample. In this case, the printed test sample includes both the figure information 34 and the character information 32 as shown in FIG. 5.

Figure 7:
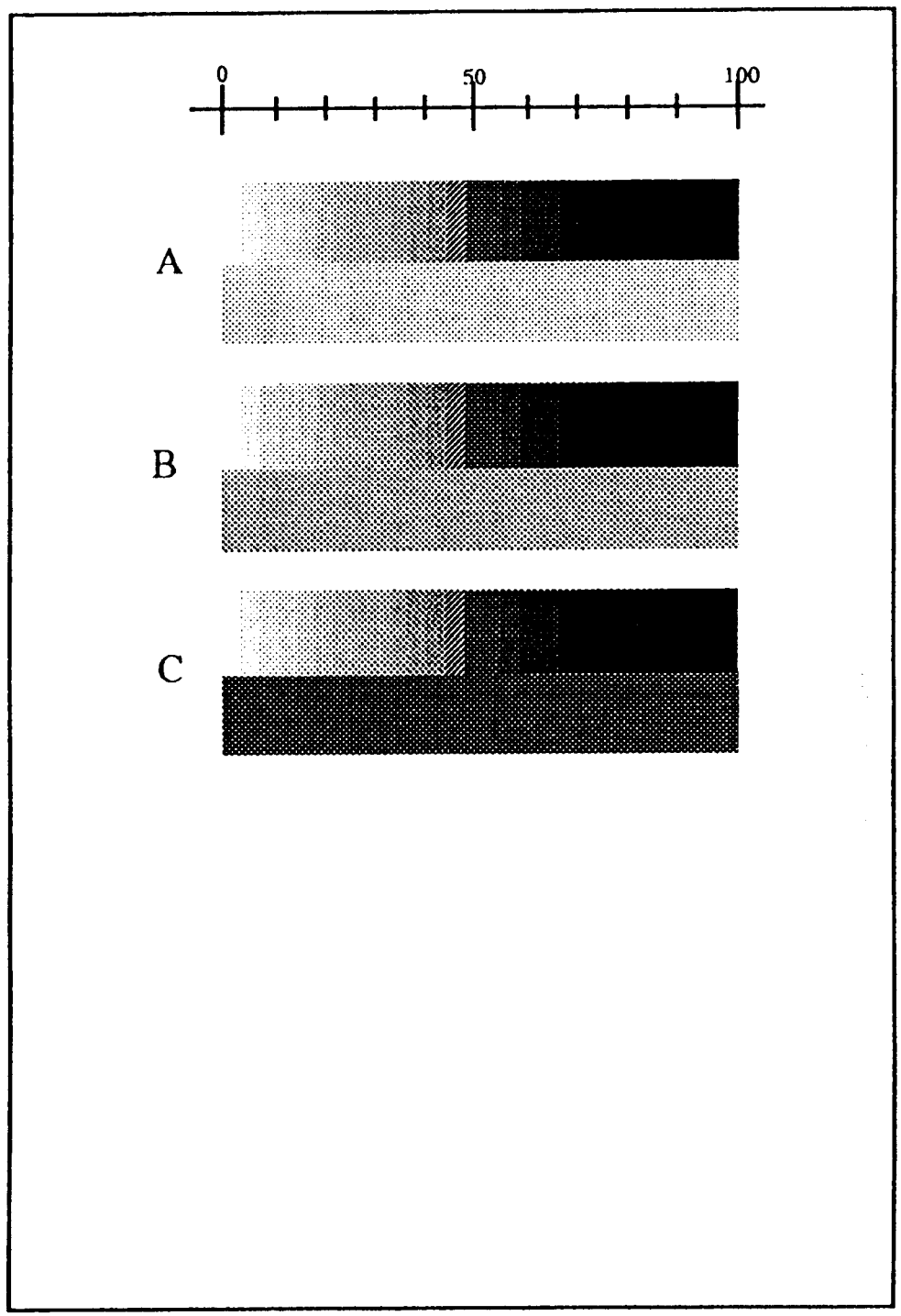
FIG. 7 shows one example of a test sample printed by the operation of FIG. 6.

On the other hand, if the user does not desire to watch the manual procedure illustrations, he/she inputs "N" (no) in S2. As a result, S3 is omitted, and only the figure information 34 is read out from the ROM 6 in S4. Accordingly, in S5, only the figure information 34 is printed out in the test sample. FIG. 7 shows a test sample which is printed with only the figure information 34.

According to the present embodiment, it is therefore possible to change a printing manner how the printer 2 prints the test sample. For example, a skilled operator does not need viewing the explanation of the manual procedures. The printer 2 can therefore provide the operator with a test sample as shown in FIG. 7 which does not include the illustration of the manual procedure. The printer can produce a simple but sufficient information to the user. The printer can print out the test sample in a short period of time.

In the above description, the test sample printing manner is switched between a mode where both the information 32 and 34 are printed and another mode where only the information 34 is printed. However, other various printing modes can be employed.

Figure 8:
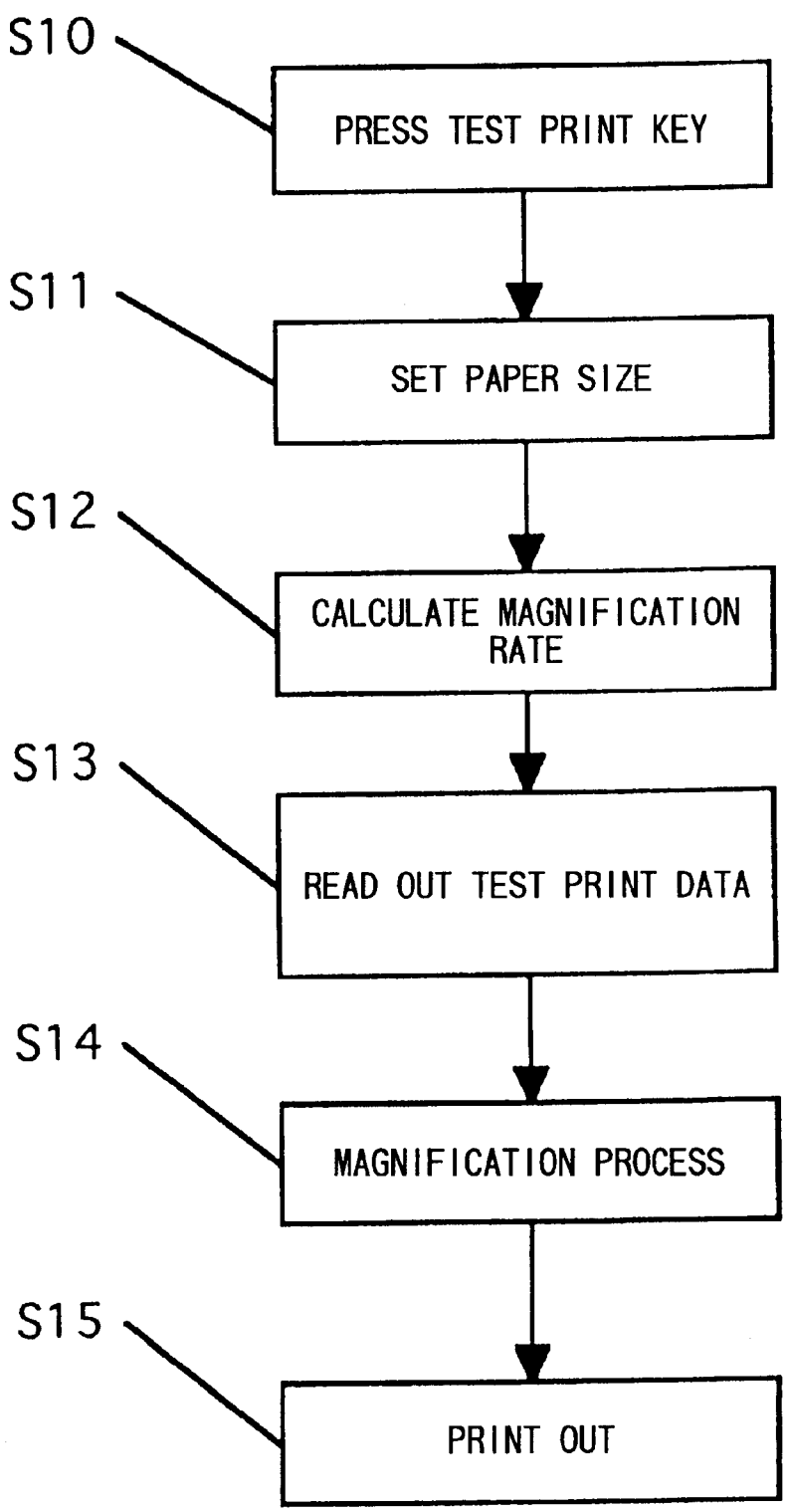
FIG. 8 is a flow chart illustrating an operation of a modification of the second embodiment.

For example, the ROM 6 can store a control program as shown in FIG. 8. According to the control program, after operating the test print key 14 in S10, the user can select in S11 a size of a paper for printing the test sample. The control portion 22 calculates in S12 a magnification rate with which the control portion 22 will magnify the test sample data 30 to conform with the selected paper size. For example, when the user selects a A4 size, the magnification rate is determined as 100%. When the user selects a A3 size, the magnification rate is determined as 141%. Then, in S13, the control portion 22 reads out test print data 30 from the ROM 6. The test print data 30 is then subjected in S14 to a magnifying process with the determined magnification rate, and converted into print control signals. Then, the control portion 22 controls in S15 the print head 10 with the print control signals.

According to this process, when the test sample is printed in a large sized paper, the gray level sequences will be printed in a larger size. The user can therefore highly precisely determine the points on the gray level sequences which appear the same as the accurate gray levels.

In the above description, the entire information of the test sample, i.e., both the character information 32 and the figure information 34 are subjected to the magnifying operation. However, only the figure information 34 may be subjected to the magnifying operation.

Figure 9:
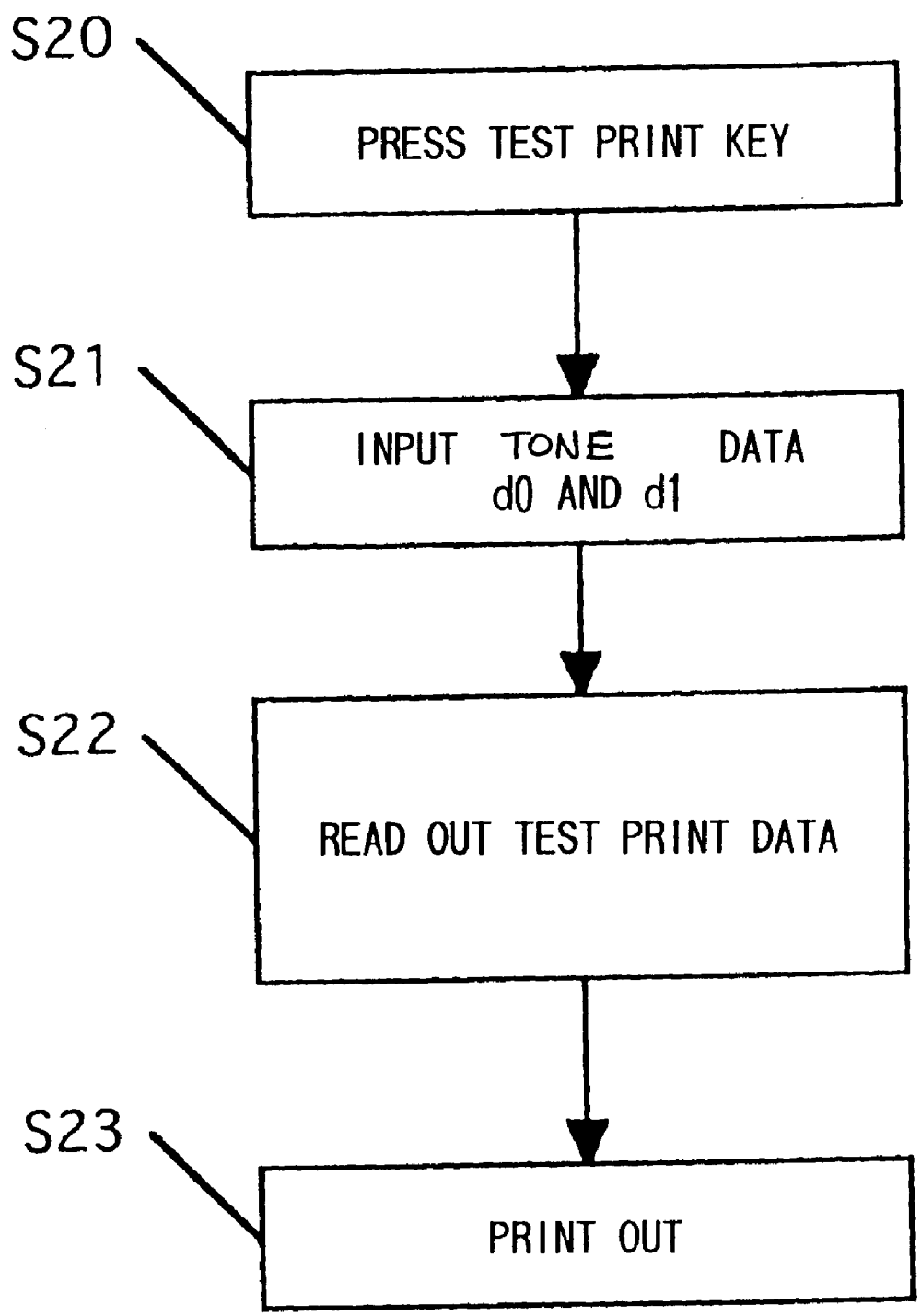
FIG. 9 is a flow chart illustrating an operation of another modification of the second embodiment.

FIG. 9 shows a control program executing another test sample printing manner.

Figure 10:
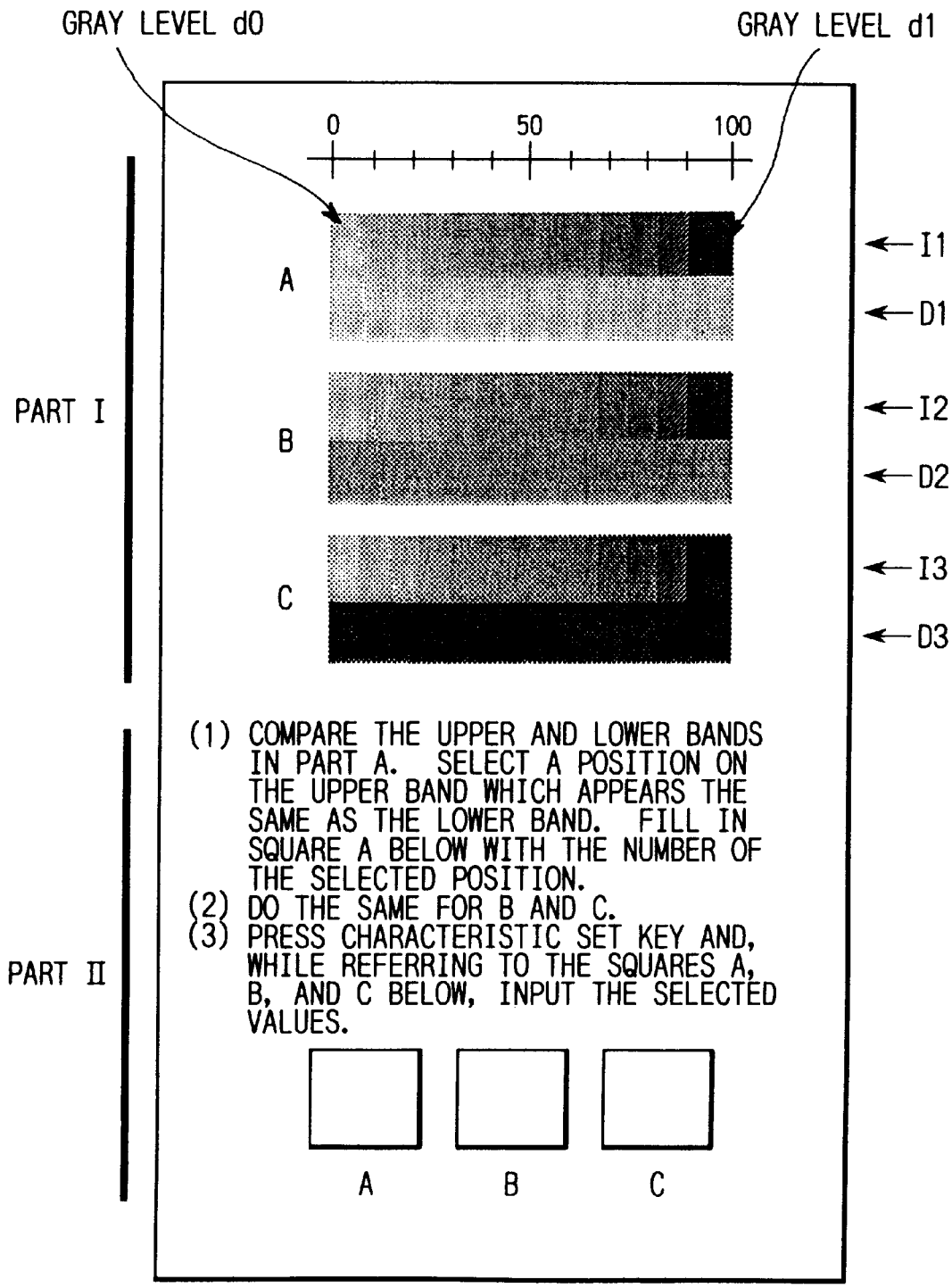
FIG. 10 shows one example of a test sample printed by the operation of FIG. 9.

When the test print key 14 is operated in S20, the control portion 22 controls the printer display (not shown) to display an order that the user should input a pair of tone signal values of d0 and d1. It is noted that the user has to set the tone signal values d0 and d1 so that all the accurate gray levels D1, D2, and D3 are positioned between gray levels which will be obtained from the tone signals d0 and d1. When the user properly inputs the tone data d0 and d1 in S21 through manipulating the key board 12, the control portion 22 reads out the test print data 30 in S22, and controls the print head 10 to print a test sample as shown in FIG. 10. In the printed gray level sequences I1, I2, and I3, the gray level gradually changes from a gray level obtained from the tone signal of d0 toward a gray level obtained from the tone signal of d1.

According to this operation, the gray level sequences on the test sample can indicate the user's desired ranges of gray level specifications of the printer. When the user sets the difference between the values d0 and d1 to a smaller value, tone levels will change more gently on the gray level sequences. Accordingly, the user can more easily but more precisely determine the points in the gray level sequences which appear the same with the accurate gray level standards.

In the above description, all the gray level sequences I1, I2, and I3 print the same range of gray level specification. However, different ranges of gray levels can be inputted for the sequences I1, I2, and I3 and can be printed on the same test sample.

A third embodiment will be described below with reference to FIGS. 11 and 12.

Figure 11:
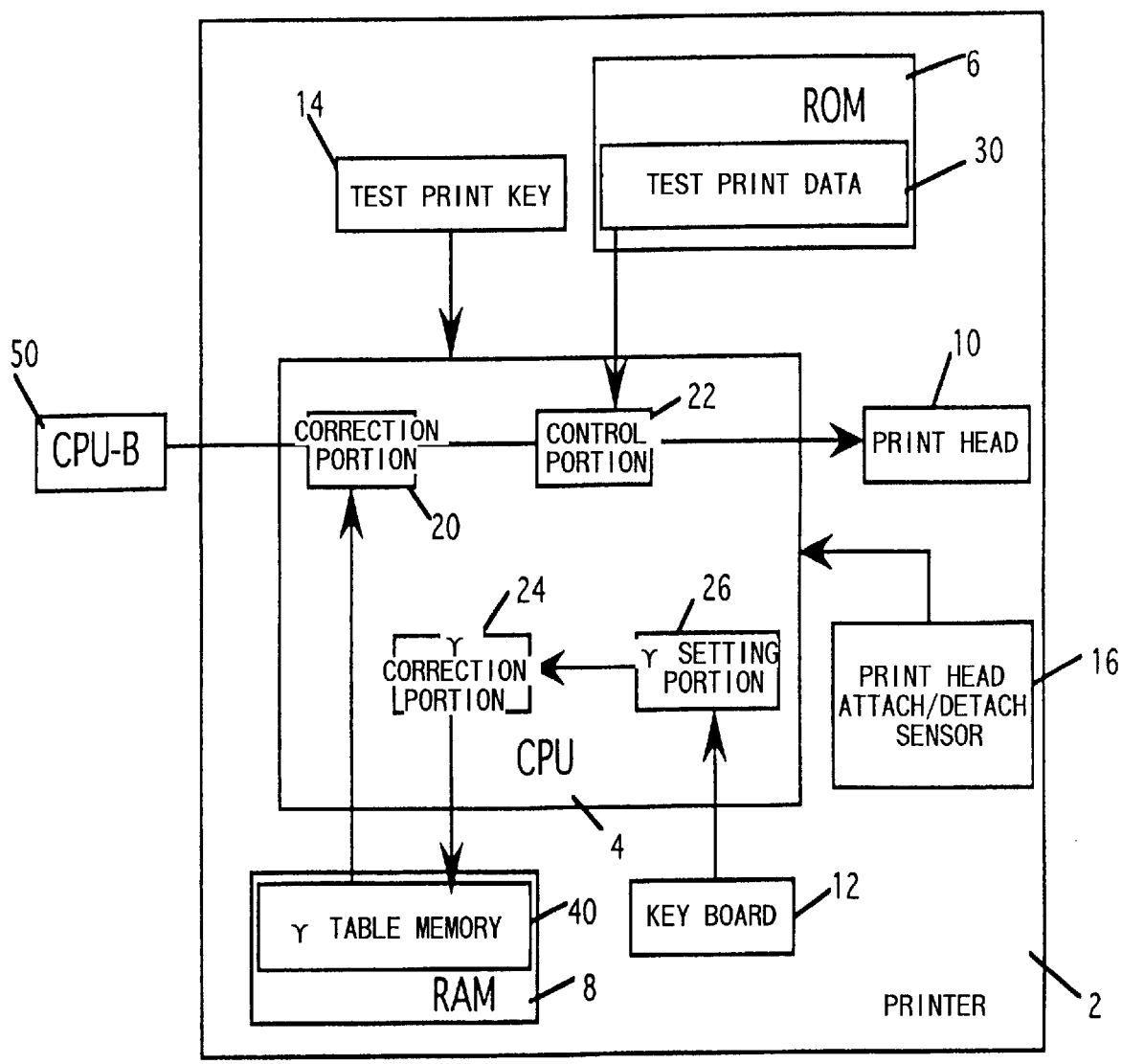
FIG. 11 is a block diagram showing a structure of a printer according to a third embodiment of the present invention.
Figure 12:
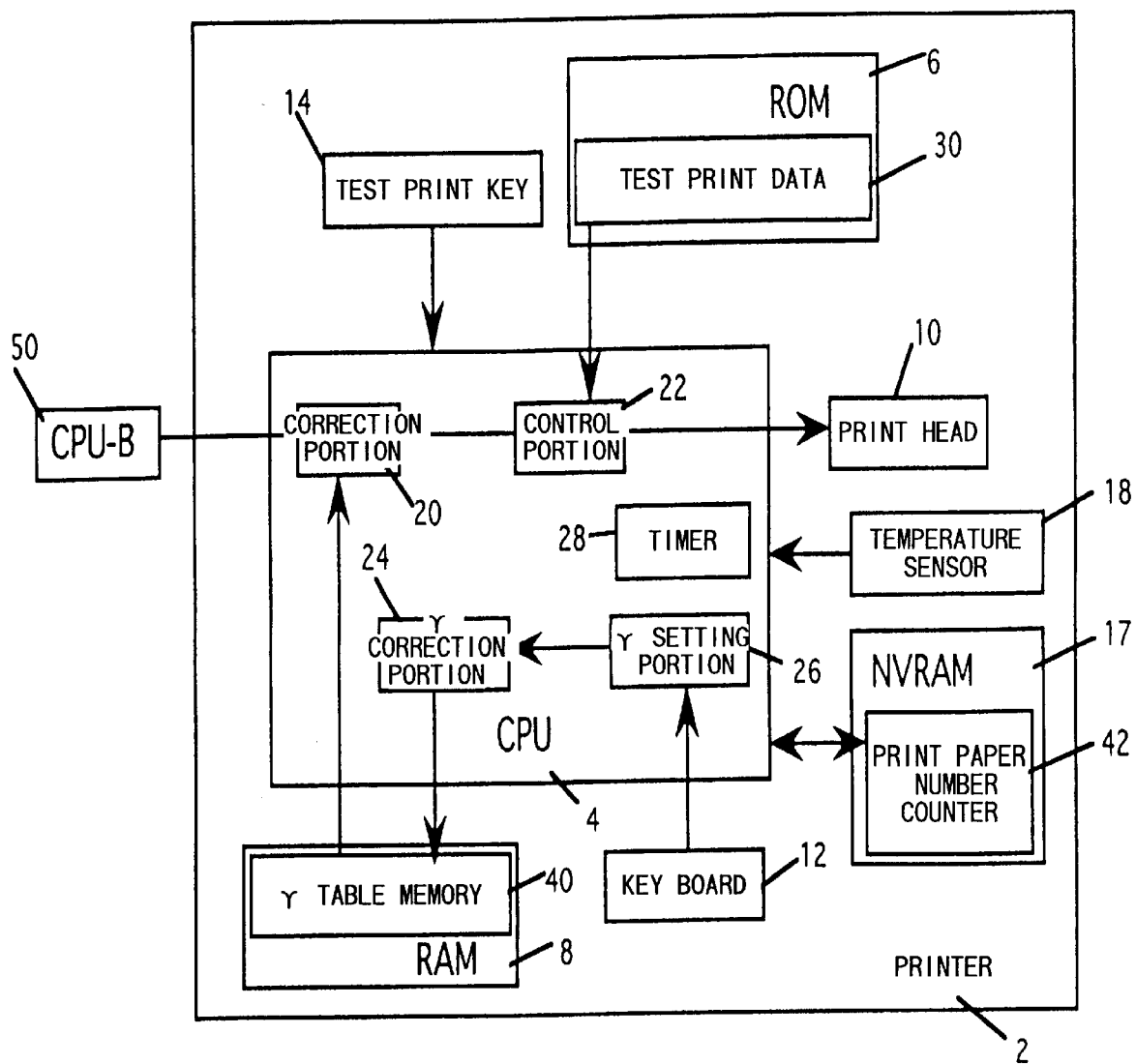
FIG. 12 is a block diagram showing a structure of a printer according to a modification of the third embodiment.

As shown in FIG. 11, according to the present embodiment, the print head 10 is provided with a head attaching mechanism, with which the print head 10 can be detachably mounted to the printer 2. A print head attaching sensor 16 is provided in the printer 2 in electrical connection with the CPU 4.

With the above-described structure, the print head attaching sensor 16 produces a detection signal when the print head 10 is detached from the printer 2 and then a new print head 10 is attached to the printer 2. When receiving the detection signal, the CPU 4 executes printing of the test sample in the same manner as when the test print key 14 is operated. That is, when the print head 10 is mounted to the printer 2 and therefore the printer 2 is brought into a printable condition, the control portion 22 automatically reads out test print data 30 from the ROM 6 and prints out the test sample as shown in FIG. 5. Receiving the test sample, the user sets the reproduction characteristic values in the same manner as described above.

Generally, the characteristic of the print heads 10 vary according to production lots of the print heads. According to the present embodiment, however, when a new print head 10 is attached to the printer 2, a test sample is automatically printed, and the user sets the characteristic values of the presently-mounted print head 10. Accordingly, differences between the respective production lots are corrected.

It is noted that the output characteristic of the print head 10 also vary dependently on the rise of temperature in the printer 2. The output characteristic also varies as time passes. In order to correct for such alteration of the output characteristic, the printer 2 may have the structure as shown in FIG. 12.

A non-volatile RAM (NVRAM) 17 is provided in the printer 2. The NVRAM 17 is formed with a counter 42 for counting the number of papers the printer 2 has printed. The NVRAM 17 is electrically connected to the CPU 4 so that data can be written in and read out from the NVRAM 17. Every time the printer 2 prints a paper, the CPU 4 adds one to the number stored in the counter 42. After printing one paper, the CPU 4 compares the number stored in the counter 42 with a predetermined threshold number stored in a certain region in the ROM 6. When the counted number exceeds the threshold number, the CPU 4 instructs printing of the test sample. The control portion 22 reads out test print data 30 from the ROM 6, converts the data into printing control signals, and then controls the print head 10 with the printing control signals. When the test sample is thus printed, the user sets the output characteristic values of the printer 2 in the same manner as described above. When the test sample printing is completed, the number stored in the counter 42 is cleared into "zero."It is noted that the threshold number can be freely changed.

According to this embodiment, a timer 28 may be further provided in the CPU 4. The timer 28 counts a time period after when the printer 2 is produced. A predetermined threshold time period is stored in another certain region in the ROM 6. The CPU 4 monitors the time counted by the timer 28, and compares the counted time with the threshold time period. When the counted timer exceeds the threshold time period, the CPU 4 instructs the control portion 22 to perform a printing operation of the test sample. When the test sample is thus printed, the user sets the output characteristic values of the printer 2 in the same manner as described above.

A temperature sensor 18 can further be provided in the printer 2 in electrical connection with the CPU 4. The temperature sensor 18 produces a temperature signal indicative of the temperature within the printer 2. A predetermined threshold temperature value is stored in the certain region in the ROM 6. The CPU 4 continuously compares the detected temperature 18 with the threshold temperature value. When the detected temperature exceeds the threshold value, the CPU 4 instructs the control portion 22 to perform a printing operation of the test sample. When the test sample is thus printed, the user sets the output characteristic values of the printer 2 in the same manner as described above.

Thus, according to the present embodiment, the printer 2 can automatically correct for changes in its reproduction characteristic. The printer 2 can therefore always output images of a fixed quality.

Figure 13:
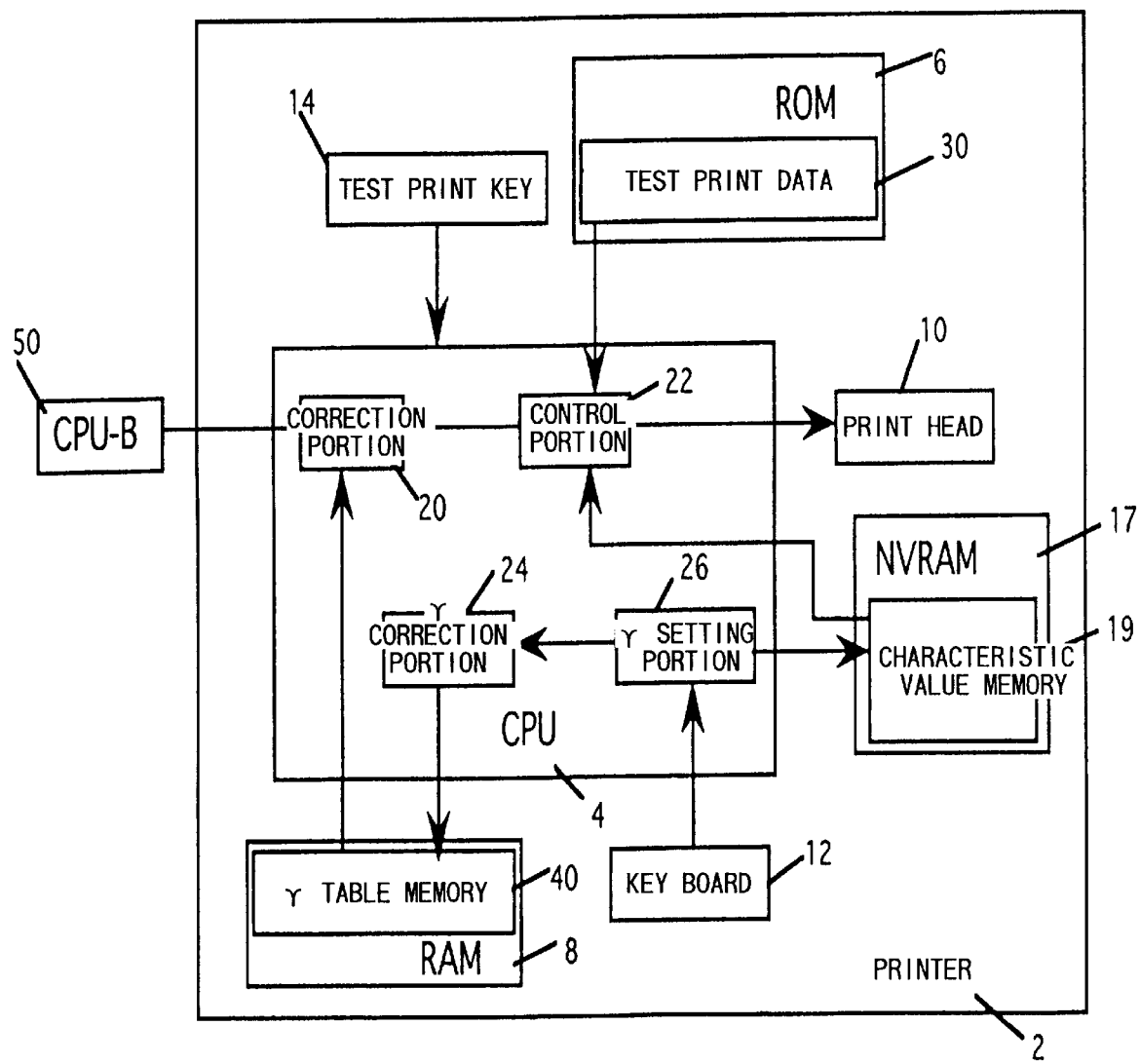
FIG. 13 is a block diagram showing a structure of a printer according to a fourth embodiment of the present invention.
Figure 14:
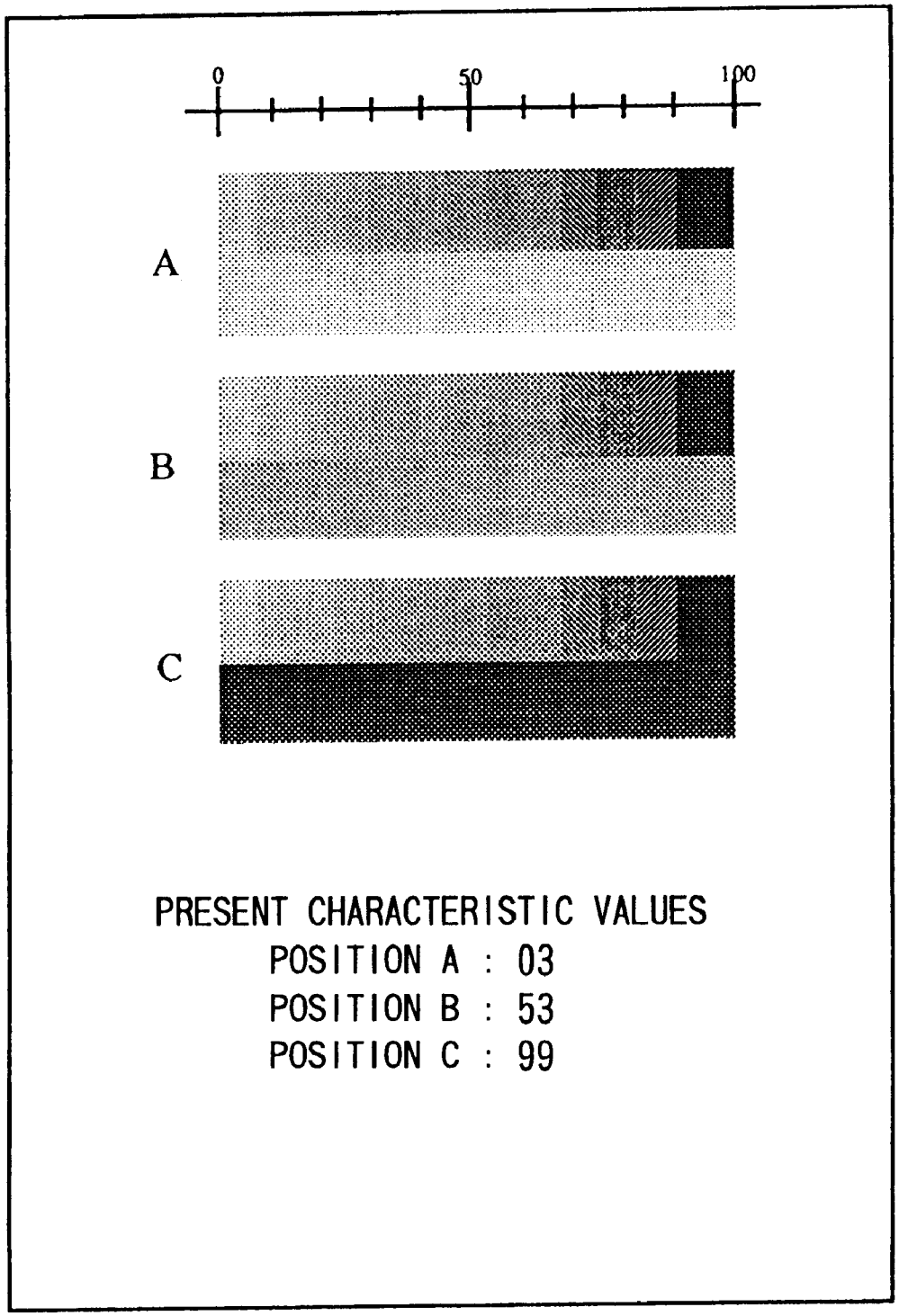
FIG. 14 shows one example of a test sample printed by the printer of FIG. 13.

A fourth embodiment will be described below with reference to FIGS. 13 and 14.

A characteristic value memory 19 is provided in the NVRAM 17. The characteristic value memory 19 is electrically connected to the CPU 4 so that the CPU 4 can write data in and read out data from the characteristic value memory 19. Except for the above-described points, the structure of the printer 2 of the present embodiment is the same as that of the first embodiment.

With the above-described structure, in the similar manner as described above, when the user operates the test print key 14, the test sample is printed out. The user then inputs the output characteristic values while viewing the test sample. When the characteristic values are thus set at the γ setting portion 26, the CPU 4 of the present embodiment writes the characteristic values into the characteristic value memory 19. When the user again operates the test print key 14, the CPU 4 reads out test print data 30 from the ROM 6 and reads out the presently-stored characteristic values from the characteristic value memory 19. The control portion 22 then produces printing control signals based on the read out information, and controls the print head 10. The print head 10 then prints out a test sample as shown in FIG. 14. This figure is directed to an exemplary case where the user has inputted the characteristic values of 03, 53,and 99 which indicate points on the gray level sequences I1, I2, and I3 which appear the same as the accurate gray levels D1, D2, and D3. The user can therefore confirm his/her set characteristic values. Even when the user has inputted wrong characteristic values, the user can immediately correct the wrong values.

In the above description, the gray level examining chart is printed together with the inputted characteristic values. However, only the inputted characteristic values may be printed.

Figure 15:
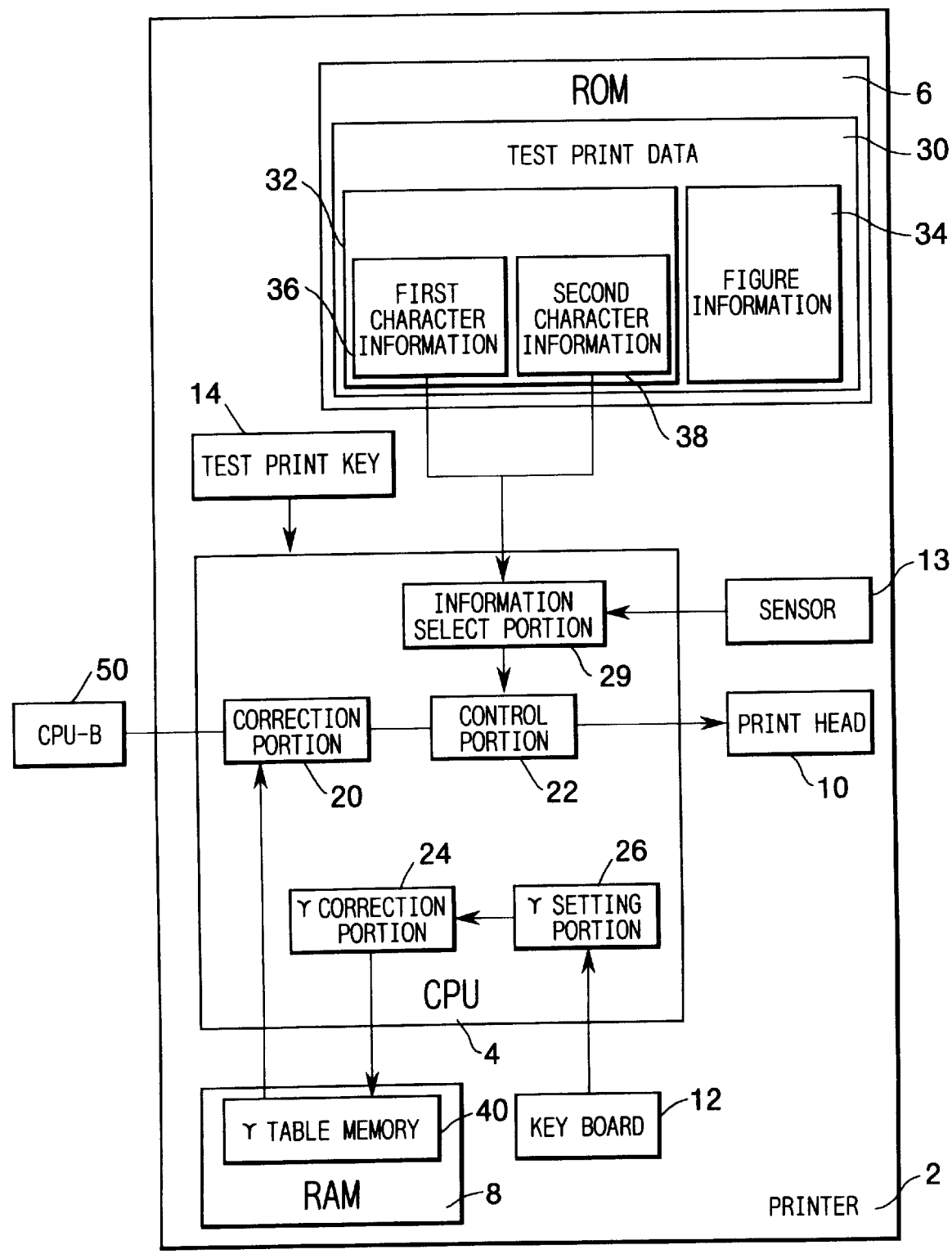
FIG. 15 is a block diagram showing a structure of a printer according to a fifth embodiment of the present invention.

A fifth embodiment will be described below with reference to FIG. 15.

A sensor 13 is provided in the printer 2. The sensor 13 is for detecting internal condition of the printer 2. For example, the sensor 13 counts the number of papers which the printer 2 has printed. Based on the counted number, the sensor 13 determines the number of papers which the printer 2 has printed after the printer printed a test sample at the latest. When printing a test sample, the sensor 13 clears the paper number. It is noted that the sensor 13 also determines the number of papers which the printer 2 has printed after the print head 10 was replaced with a new one. When the replacement of the print head 10 is performed, the sensor 13 clears the paper number. It is further noted that when the number of papers, which the printer 2 has printed after the print head 10 was replaced with a new one, exceeds a predetermined number, the sensor determines the paper number as "−1."

Based on the above-described determination operation, the sensor 13 usually outputs a signal indicative of the number of papers which the printer 2 has printed after the printer 2 printed a latest test sample. When printing a test sample, the sensor outputs a signal of "0." Similarly, when the print head 10 is replaced with a new one, the sensor outputs a signal of "0." When the number of papers, which the printer 2 has printed after the print head 10 was replaced with a new one, exceeds the predetermined number, the sensor outputs a signal indicative of "−1." The signal of "−1" therefore indicate that the output characteristic of the print head 10 may be greatly deteriorated and therefore that the print head 10 should be replaced with a new one.

A predetermined threshold number is stored in a certain region of the ROM 6. When the paper number outputted from the sensor 13 exceeds the threshold number, it can be judged that the output characteristic may possibly be changed and therefore that the printer should print a test sample.

According to the present embodiment, the character information 32 of test print data 30 includes: first character information 36 and second character information 38. In this example, the second character information 38 represents the manual procedure explanations (1)–(3) as printed in the part II of the test sample in FIG. 5. The first character information 36 represents a sentence that reads "Please replace the print head 10 with a new one."

An information selecting portion 29 is provided in the CPU 4. The information selecting portion 29 is for receiving information outputted from the sensor 13, selecting either one of the first and second character information 36 and 38 according to the received information, and outputting the selected information to the control portion 22.

With the above-described structure, the printer 2 of the present embodiment performs the following operation.

When receiving certain signals from the sensor 13, the CPU 4 instructs the control portion 22 to perform test printing operation. Simultaneously, the information selecting portion 29 receives the signals from the sensor 13. The information selecting portion 29 selects either one of the first and second character information 36 and 38 according to the signals from the sensor 13. The selecting portion 29 supplies the control portion 22 with the selected character information. Then, the control portion 22 reads out figure information 34 from the ROM 6, converts the read out entire information into printing control signals, and controls the print head 10 according to the printing control signals. The print head 10 will therefore print a test sample where the figure information 34 and the selected one of the first and second character information 36 and 38 are printed.

In the above-described example, the CPU 4 continuously receives the paper number indicating signals from the sensor 13. The CPU 4 compares the paper number with the threshold number stored in the ROM 6. When the paper number exceeds the threshold, the CPU 4 instructs the control portion 22 to perform the test printing operation in the same manner as described in the first embodiment. Also when the CPU 4 receives the signal indicative of "−1," the CPU 4 instructs the control portion 22 to perform the test printing operation.

As described above, the information selecting portion 29 also receives those paper number indicating signals from the sensor 13. Accordingly, when the control portion 22 is instructed to perform the test printing operation, the information selecting portion 29 starts comparing the paper number with the threshold stored in the ROM 6. In this case, the paper number is either a value greater than the threshold or a value of "−1." Accordingly, when the information selecting portion 29 judges that the paper number is greater than the threshold, the information selecting portion 29 selects the second character information 38. Accordingly, the manual procedure explanations will be printed on the sample. On the other hand, when the information selecting portion 29 judges that the paper number is lower than the threshold, the information selecting portion 29 selects the first character information 36. Accordingly, the test sample will be read as "Please replace the print head 10 with a new one."

Thus, according to the present embodiment, the printer can produce test samples that suit for various conditions. The operability of the printer will therefore be greatly enhanced.

As described above, the printer of the present embodiments is for correcting input image data and for printing out the corrected input image data. In the printer, the correction value memory 40 stores correction values used for correcting input image data. The image information memory 6 stores reference image information inclusive of figure information 34 and character information 32. The figure information 34 is used for determining a characteristic value of the printer, and the character information includes information on manual procedures employed for determining the characteristic value. The printing head 10 prints the reference image information. The characteristic value setting portion 26 sets the characteristic value according to the printed reference image information. In more concrete terms, a user inputs the characteristic value while viewing the printed reference image information. The characteristic value setting portion 26 receives the inputted value and sets the value as the characteristic value. Because the reference image information includes the character information, the user can easily input the characteristic value to the printer. The correction value changing portion 24 changes the correction value stored in the correction value memory 40 based on the set characteristic value. The correction portion 20 corrects input image data based on the changed correction value now stored in the correction value memory portion 40.

The printer may also include the information detecting sensors 16, 42, 18, 28, and 13 for detecting certain information in the printing apparatus. The printing head prints the reference image information based on the detected results. Accordingly, the output characteristic of the printer can be more stably maintained.

The reference image information stored in the image information memory may include a plurality of different sets of character data. The character selecting portion 29 selects one set of character data out of the plurality of sets of character data, and the printing portion 10 prints the selected set of character data. Accordingly, the printer can output reference image information suited for various conditions of the printer. The operability of the printer can be greatly enhanced.

The printing portion 10 may be detachably mounted in the printer. The information detecting sensor 16 detects whether the printing head 10 is attached to the printer. The printer prints the reference image information in accordance with the condition of the printing head 10. Accordingly, even when the printing head 10 is changed with a new one, the printer can maintain its output characteristic.

Because the information detecting sensor 42 detects the number of sheets the printing head 10 has printed, the printer can maintain its output characteristic regardless of whether the printer prints a plurality of papers.

Because the information detecting sensor 28 detects time, the printer can maintain its output characteristic regardless of whether time passes after the printer is produced.

Because the information detecting sensor 18 detects temperature, the printer can maintain its output characteristic regardless of whether temperature changes in the printer.

The printing manner, in which the printer prints the reference image information, can be freely set as in S2, S11, and S21. For example, as in S2, the user can select whether certain information should be included in the reference image information. Accordingly, the printer can provide reference image information suited to the user's condition.

In S11, the user can select a size of a paper, onto which the reference image information is desired to be printed. In this case, the reference image information 30 is converted in S14 with a magnification rate determined according to the set paper size. The printing head 10 prints the reference image information based on the converted reference image information. Accordingly, regardless of the paper size, the reference image information printed on the paper can be easily grasped by the user.

In S21, tone information can be freely set by the user. Because the reference image information is printed with the user's desired tone information, the user can easily examine the reference image information and determine the characteristic value.

The characteristic value memory 19 stores the set characteristic value. The printer prints the set characteristic value. Accordingly, the user can confirm the his/her input value.

Thus, as described above, the test print data 30 not only includes the gray level examining charts but also may include explanations of the manual procedures. Accordingly, the user can easily perform the output characteristic setting operation. The test samples are automatically printed out in various situations where the output characteristic might be changed. Accordingly, the operability of the printer are greatly enhanced.

While the invention has been described in detail with reference to specific embodiments thereof, it would be apparent to those skilled in the art that various changes and modifications may be made therein without departing from the spirit of the invention.

What is claimed is:

1. A printing apparatus for correcting input image data and for printing out the corrected input image data; the printing apparatus comprising:
    correction value memory means for storing correction values employed for correcting input image data;
    image information memory means for storing reference image information inclusive of figure information and character information, the figure information being used for determining a characteristic value of the printing apparatus, the character information including information on manual procedures employed for determining the characteristic value;
    printing means for printing the reference image information;
    characteristic value setting means for allowing an operator to determine and set the characteristic value according to the manual procedures indicated by the printed reference image information;
    correction value changing means for changing the correction value stored in the correction value memory means based on the set characteristic value; and
    correction means for correcting input image data based on the changed correction value stored in the correction value memory means.

2. A printing apparatus of claim 1, further comprising printing manner setting means for setting a printing manner in which the printing means prints the reference image information stored in the image information memory, the printing means printing the reference image information in the set printing manner.

3. A printing apparatus of claim 2, wherein the printing manner setting means sets a size of a paper onto which the printing means prints the reference image information,
    further comprising image conversion means for converting the reference image information stored in the image information memory means with a magnification rate determined according to the set paper size to converted reference image information, the printing means printing the converted reference image information.

4. A printing apparatus of claim 2, wherein the printing manner setting means sets a tone information, the printing means printing the reference image information based on the set tone information.

5. A printing apparatus of claim 1, further comprising characteristic value memory means for storing the set characteristic value, the printing means printing information stored in the characteristic value memory means.

6. A printing apparatus of claim 1, further comprising information detecting means for automatically detecting certain information in the printing apparatus, wherein the printing means prints the reference image information based on the detected results, said certain information indicative of change of a printing characteristic of the printing apparatus.

7. A printing apparatus of claim 6, wherein the printing means is detachably mounted in the printing apparatus, and wherein the information detecting means automatically detects whether the printing means is attached to the printing apparatus.

8. A printing apparatus of claim 6, wherein the information detecting means automatically detects the number of sheets the printing means has printed.

9. A printing apparatus of claim 6, wherein the information detecting means automatically detects time.

10. A printing apparatus of claim 6, wherein the information detecting means automatically detects temperature.

11. A printing apparatus of claim 6, wherein the character information stored in the image information memory includes a plurality of sets of character data, each data set being indicative of information on a corresponding manual procedure,
    further comprising character selecting means for selecting one set of character data out of the plurality of sets of character data based on the detected results, the printing means printing the selected set of character data.

12. A printing apparatus of claim 1, wherein said information on manual procedures employed for determining the characteristic value includes information concerning comparing portions of said figure information and inputting characteristic value information to said characteristic value setting means.

13. A printing apparatus for correcting input image data and for printing out the corrected input image data; the printing apparatus comprising:
    correction value memory means for storing correction values employed for correcting input image data;
    image information memory means for storing reference image information used for determining a characteristic value of the printing apparatus;
    information detecting means for automatically detecting certain information in the printing apparatus, said certain information indicative of change of a printing characteristic of the printing apparatus;
    printing means for printing the reference image information based on the detected results;
    characteristic value setting means for setting the characteristic value according to the printed reference image information;
    correction value changing means for changing the correction value stored in the correction value memory means based on the set characteristic value; and
    correction means for correcting input image data based on the changed correction value stored in the correction value memory means.

14. A printing apparatus of claim 13, wherein the reference image information stored in the image information memory stores figure data used for determining the characteristic value of the printing apparatus and a plurality of sets of character data,
    further comprising character selecting means for selecting one set of character data out of the plurality of sets of character data based on the detected results, the printing means printing the selected set of character data.

15. A printing apparatus of claim 13, wherein the printing means is detachably mounted in the printing apparatus, and wherein the information detecting means automatically detects whether the printing means is attached to the printing apparatus.

16. A printing apparatus of claim 13, wherein the information detecting means automatically detects the number of sheets the printing means has printed.

17. A printing apparatus of claim 13, wherein the information detecting means automatically detects time.

18. A printing apparatus of claim 13, wherein the information detecting means automatically detects temperature.

19. A printing apparatus of claim 13, further comprising printing manner setting means for setting a printing manner in which the printing means prints the reference image information stored in the image information memory, the printing means printing the reference image information in the set printing manner.

20. A printing apparatus of claim 19, wherein the printing manner setting means sets a size of a paper onto which the printing means prints the reference image information, further comprising image conversion means for converting the reference image information stored in the image information memory means with a magnification rate determined according to the set paper size to converted reference image information, the printing means printing the converted reference image information.

21. A printing apparatus of claim 19, wherein the printing manner setting means sets a tone information, the printing means printing the reference image information based on the set tone information.

22. A printing apparatus of claim 13, further comprising characteristic value memory means for storing the set characteristic value, the printing means printing information stored in the characteristic value memory means.

* * * * *